United States Patent
Rodoni

(10) Patent No.: US 10,035,647 B1
(45) Date of Patent: Jul. 31, 2018

(54) WASTE RECEPTACLE AND SYSTEM HAVING VISUAL INDICATOR

(71) Applicant: Rubicon Global Holdings, LLC, Atlanta, GA (US)

(72) Inventor: Philip Rodoni, Decatur, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 0 days.

(21) Appl. No.: 15/635,879

(22) Filed: Jun. 28, 2017

(51) Int. Cl.
| | |
|---|---|
| *G01G 19/52* | (2006.01) |
| *G01G 23/37* | (2006.01) |
| *B65F 1/06* | (2006.01) |
| *B65F 1/14* | (2006.01) |
| *G08B 21/00* | (2006.01) |
| *G06K 9/00* | (2006.01) |
| *G06T 7/40* | (2017.01) |
| *B65F 3/04* | (2006.01) |
| *H04N 5/232* | (2006.01) |
| *B65F 1/16* | (2006.01) |

(Continued)

(52) U.S. Cl.
CPC .............. *B65F 1/1484* (2013.01); *B65F 1/06* (2013.01); *B65F 1/1473* (2013.01); *B65F 1/16* (2013.01); *G01G 19/52* (2013.01); *G01G 23/3735* (2013.01); *G08B 21/182* (2013.01); *B65F 3/041* (2013.01); *B65F 2210/128* (2013.01); *B65F 2210/138* (2013.01); *B65F 2210/1443* (2013.01); *B65F 2210/1446* (2013.01); *B65F 2210/152* (2013.01); *B65F 2210/168* (2013.01); *B65F 2210/182* (2013.01); *B65F 2210/184* (2013.01); *G06K 9/00771* (2013.01); *G06T 2207/30232* (2013.01); *H04N 7/188* (2013.01)

(58) Field of Classification Search
CPC .......... G01D 7/00; G01D 7/002; G01D 7/005; G01G 19/14; G01G 19/52; G01G 23/20; G01G 23/206; B65F 1/06; B65F 1/14; B65F 1/1468; B65F 1/1473; B65F 1/1484; B65F 1/16; B65F 2210/128; B65F 2210/152; B65F 2210/168; B65F 2210/182; B65F 2210/138; B65F 2210/184; B65F 2210/144; B65F 2210/1443; B65F 2210/1446; B65F 3/041; G06T 7/001; G06T 2207/30232; G06T 2207/30252; H04N 7/188; G06K 9/00771; G08B 21/182
See application file for complete search history.

(56) References Cited

U.S. PATENT DOCUMENTS

| | | | | |
|---|---|---|---|---|
| 4,773,027 A | * | 9/1988 | Neumann ............. | B30B 9/3007 100/229 A |
| 5,016,197 A | * | 5/1991 | Neumann ............. | B30B 9/3007 100/229 A |

(Continued)

*Primary Examiner* — Randy Gibson
(74) *Attorney, Agent, or Firm* — Rock IP, PLLC

(57) ABSTRACT

A system is disclosed for monitoring waste collected by a service vehicle. The system may include a receptacle having an opening configured to receive waste, and an indicator associated with the receptacle and configured to visually indicate an amount of waste inside the receptacle. The system may also include a sensor configured to capture an image of the visual indicator and to generate a signal corresponding to the image, a display, and a controller in communication with the sensor and the display. The controller may be configured to cause a representation of the amount of waste in the receptacle to be shown on the display based on the signal.

21 Claims, 3 Drawing Sheets

(51) Int. Cl.
  *G08B 21/18* (2006.01)
  *H04N 7/18* (2006.01)

(56) References Cited

U.S. PATENT DOCUMENTS

| | | | | | |
|---|---|---|---|---|---|
| 5,173,866 | A | * | 12/1992 | Neumann | B30B 9/3007 100/229 A |
| 5,214,594 | A | * | 5/1993 | Tyler | B30B 9/3007 100/229 A |
| D346,056 | S | * | 4/1994 | Keeney | D34/7 |
| 5,303,642 | A | * | 4/1994 | Durbin | B30B 9/3007 100/193 |
| 5,416,279 | A | * | 5/1995 | Tseng | G01G 19/14 116/DIG. 32 |
| 5,455,625 | A | * | 10/1995 | Englander | B60R 11/04 348/372 |
| 5,558,013 | A | * | 9/1996 | Blackstone, Jr. | B30B 9/3007 100/218 |
| 6,123,017 | A | * | 9/2000 | Little | B30B 9/3007 100/229 A |
| 6,198,502 | B1 | * | 3/2001 | Watkins | B60R 11/04 348/148 |
| 6,561,085 | B1 | * | 5/2003 | Durbin | B30B 9/3007 100/229 A |
| 7,146,294 | B1 | * | 12/2006 | Waitkus, Jr. | B30B 9/3007 100/99 |
| 7,236,088 | B2 | * | 6/2007 | Matsukawa | B60Q 1/447 340/435 |
| 7,456,847 | B2 | * | 11/2008 | Krajec | G01S 5/0257 340/901 |
| 7,999,688 | B2 | * | 8/2011 | Healey | B65F 1/14 340/573.1 |
| 8,004,394 | B2 | * | 8/2011 | Englander | B60Q 1/24 340/433 |
| 8,334,879 | B2 | * | 12/2012 | Krajec | G01S 5/0257 340/901 |
| 8,577,595 | B2 | * | 11/2013 | Zhao | G01C 21/165 382/103 |
| 8,674,243 | B2 | * | 3/2014 | Curotto | G06Q 10/30 177/136 |
| 8,944,249 | B1 | * | 2/2015 | Mullaney | B65F 1/14 177/144 |
| 9,199,576 | B2 | * | 12/2015 | Van Wiemeersch | B60R 1/00 |
| 9,342,884 | B2 | * | 5/2016 | Mask | G06K 9/00201 |
| 9,342,888 | B2 | * | 5/2016 | Menashe | G01S 5/163 |
| 9,347,821 | B1 | * | 5/2016 | Mullaney | G01G 19/62 |
| 9,721,342 | B2 | * | 8/2017 | Mask | H04N 7/188 |
| 9,754,382 | B1 | * | 9/2017 | Rodoni | G06T 7/90 |
| 9,888,159 | B2 | * | 2/2018 | Loh | H04N 5/2257 |
| 9,888,160 | B2 | * | 2/2018 | Loh | H04N 7/183 |
| 2008/0072404 | A1 | * | 3/2008 | Wetter | B60R 22/12 24/68 R |
| 2009/0119113 | A1 | * | 5/2009 | Dancy | B65F 1/02 705/308 |
| 2009/0161907 | A1 | * | 6/2009 | Healey | B65F 1/14 382/100 |
| 2010/0071572 | A1 | * | 3/2010 | Carroll | B30B 9/3007 100/229 A |
| 2014/0318876 | A1 | * | 10/2014 | Kellams | G01G 23/005 177/45 |

* cited by examiner

US 10,035,647 B1

WASTE RECEPTACLE AND SYSTEM HAVING VISUAL INDICATOR

TECHNICAL FIELD

The present disclosure relates generally to waste receptacle and, more particularly, to a waste receptacle and system having a visual indicator.

BACKGROUND

Service vehicles have been widely used in the waste industry to collect waste discarded from residential customers and to transport the collected waste to a final disposition location. The waste is generally placed out by the customer for collection in one of two ways. In particular, the waste is either placed inside of a flexible and disposable receptacle (e.g., inside a plastic garbage bag) and left curbside, and/or placed inside of a rigid receptacle (e.g., a can or a tote) that is then moved curbside once filled. The flexible receptacles are generally picked up by hand and tossed into the service vehicle, while the rigid receptacles are generally picked up by an automated lifting mechanism and dumped into the service vehicle.

It can be important to gather information about the receptacles and/or the waste collected from the receptacles during servicing. For example, some service providers bill their customers based on an amount of waste (e.g., a weight of the waste) collected from each customer location. In another example, compliance with particular regulations (e.g., roadway regulations, emissions regulations, recycling regulations, hazardous waste regulations, etc.) requires that information be collected in association with waste discarded by particular customers and/or transported to particular final disposition locations. Current technology does not provide for tracking of the amount of waste collected from a residential customer.

The disclosed receptacles and system are directed to overcoming one or more of the problems set forth above and/or other problems of the prior art.

SUMMARY

In one aspect, the present disclosure is directed to a waste receptacle. The waste receptacle may include a bag having an opening configured to receive waste, and a visual indicator associated with the bag. The visual indicator may be configured to indicate an amount of waste inside the bag based on deformation.

In another aspect, the present disclosure is directed to another waste receptacle. This waste receptacle may include a rigid container having an opening configured to receive waste, a support configured to support the rigid container, and a visual indicator disposed between the rigid container and the support. The visual indicator is configured to indicate an amount of waste inside the rigid container.

In yet another aspect, the present disclosure is directed to a system for monitoring waste collected by a service vehicle. The system may include a receptacle having an opening configured to receive waste, and an indicator associated with the receptacle and configured to visually indicate an amount of waste inside the receptacle. The system may also include a sensor configured to capture an image of the visual indicator and to generate a signal corresponding to the image, a display, and a controller in communication with the sensor and the display. The controller may be configured to cause a representation of the amount of waste in the receptacle to be shown on the display based on the signal.

DETAILED DESCRIPTION

Figure 1:
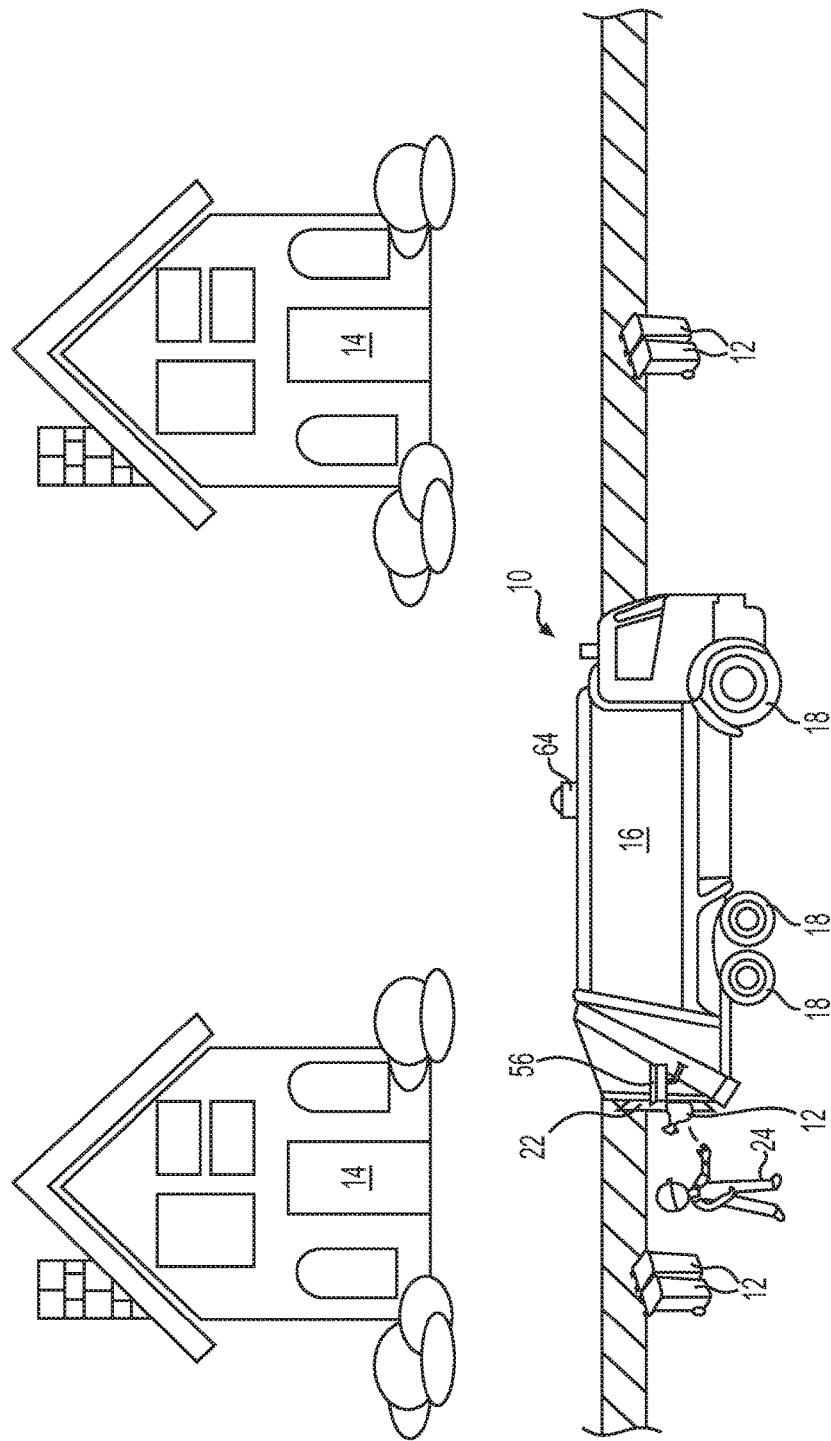
FIG. 1 is an isometric illustration of an exemplary disclosed waste service environment.

FIG. 1 illustrates an exemplary waste service vehicle 10 that is configured to service one or more receptacles 12 set out at a residential customer location 14. The service may include, for example, the removal of waste materials from inside of receptacle 12, the removal of receptacle 12, and/or the placement of new or additional receptacles 12 at a particular customer location.

Service vehicle 10 may take many different forms. In the example shown in FIG. 1, service vehicle 10 is a manual-type, rear-loading service vehicle. Specifically, service vehicle 10 may include a bed 16 supported by a plurality of wheels 18, and a cab 20 located forward of bed 16. An opening 22 may be formed at a rear of bed 16, and an operator 24 may be tasked with placing receptacles 12 and/or dumping receptacles 12 into bed 16 via the opening. In another example (not shown), service vehicle 10 may be equipped with a lifting device that is controlled to automatically lift up receptacles 12, for example from the rear, side, and/or front of service vehicle 10. In another example (not shown), service vehicle 10 may be a flatbed or roll-off type of service vehicle, wherein the lifting device is powered to load receptacle 12 onto bed 16 for transportation of receptacle 12 away from the environment. Other configurations may also be possible.

Figure 2:
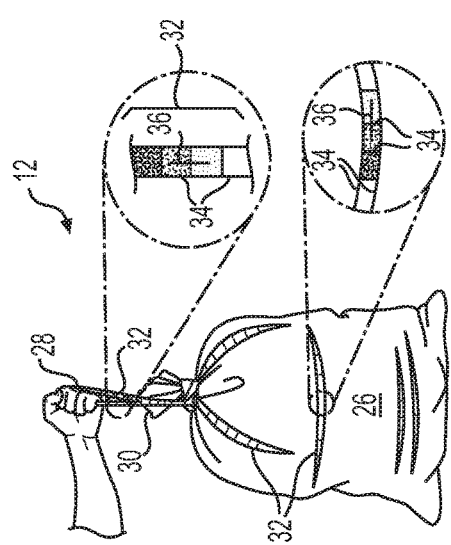
FIGS. 2 and 3 are isometric illustrations of exemplary disclosed waste receptacles that may be used within the environment of FIG. 1.
Figure 3:
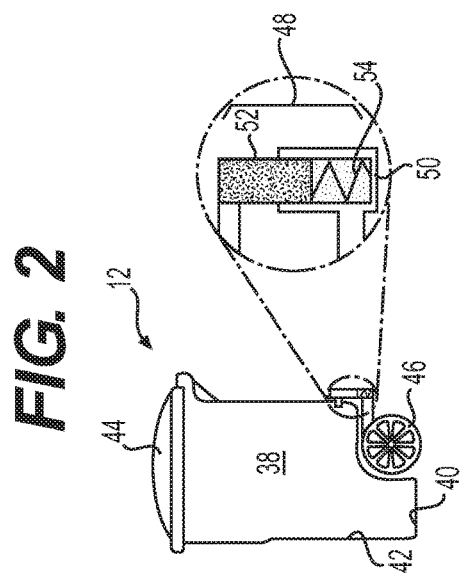
Figure 5:
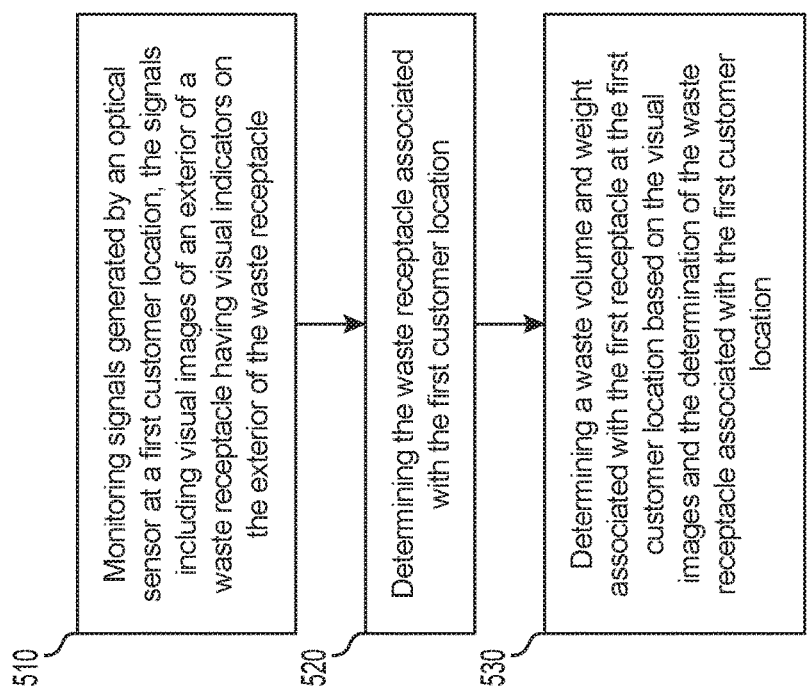
FIG. 5 is a flowchart for the method disclosed hereinafter.

Examples of receptacle 12 are shown in FIGS. 2 and 3. In the example of FIG. 2, receptacle 12 is flexible and disposable. For example, receptacle 12 may include a thin-walled polymer bag 26 having one or more straps or handles 28 located at or around an open end 30 of bag 26. Bag 26 may be available in many different shapes, sizes, colors, and/or wall thicknesses. At least one of bag 26 and strap 28 may include a visual indicator 32 configured to provide a visual indication of an amount (e.g., a weight and/or a volume) of material contained inside of bag 26.

In a first embodiment, visual indicator 32 is associated with strap 28. For example, strap 28 may be formed from an elastic (e.g., polymer) material, and have a thickness designed to support a minimum amount of weight inside of bag 26 without deformation (e.g., without stretching). As bag 26 is filled with more weight, strap 28 may begin to stretch, and stretch in an amount generally proportional to the increasing weight. In this example, visual indicator 32 may include index markings 34 spaced a predefined distance apart from each other that extend in a direction generally orthogonal to the length of strap 28. As long as the amount of waste placed inside of bag 26 remains below the threshold amount, the distance between adjacent index markings 34 may remain about the same. However, as more waste is placed inside of bag 26 and strap 28 begins to stretch, the distance between index markings 34 may increase. This distance may then be observed and, as will be described in more detail below, related to the amount of waste inside of bag 26. In a similar example, one or more index markings 36 could alternatively be aligned on strap 28 in the length direction and have a predefined length. In this example, as waste in excess of the threshold amount is placed inside of bag 26, the length of index marking(s) 36 may increase by an observable amount that can be related to the weight of the waste. In one embodiment, markings 34 and/or 36 may only appear after some stretching has occurred. It is contemplated that, instead of using spacing and/or length changes within strap 28 as the index for determining the amount of waste inside of bag 26, portions of strap 28 could alternatively or additionally be configured to change appearance (e.g., color, sheen, texture, etc.) in a way that is relatable to the waste amount. In this example, the color, sheen, and/or texture change may function as index 34 and/or 36.

In a second embodiment also associated with FIG. 2, visual indicator 32 is associated with bag 26, instead of or in addition to visual indicator 32 of strap 28. In particular, bag 26 may also be configured to deform (e.g., to stretch) when loaded with waste in excess of the minimum amount. Like strap 28, bag 26 may be provided with index markings 34 and/or 36, which can be used in the same manner described above. In this embodiment, markings 34 and/or 36 may extend in a length and/or width direction of bag 26, since bag 26 may stretch in both directions. In addition, instead of providing an indication primarily of a weight of the waste contained inside of bag 26, markings 34 and/or 36 on bag 26 may also or alternatively provide an indication of a volume of the waste. For example, one or more markings on bag 26 (e.g., horizontally arranged markings) may be primarily associated with volume, while one or more markings on bag 26 (e.g., vertically arranged markings that are generally orthogonal to the horizontal markings) may be primarily associated with weight. In these applications, a combination of the markings on bag 26 may be used alone (e.g., without markings on strap 28) to determine a density and/or a makeup of the waste inside of bag 26. Alternatively or additionally, the markings of strap 28 may be used in conjunction with the markings of bag 26 to determine the density and makeup of the waste inside of bag 26. It is also contemplated that determinations made based on the markings of bag 26 may be used to confirm similar determinations made based on the markings of strap 28 (and vice versa), such that the redundancy may improve accuracy in the determinations.

In the example of FIG. 3, receptacle 12 is rigid and reusable. For example, receptacle 12 may include, among other things, a container 38. Container 38 may be a generally enclosed vessel made from a lower surface 40, and a side surface 42 that surrounds a perimeter of lower surface 40 and extends upward in a normal direction away from lower surface 40. In the disclosed embodiment, lower surface 40 and side surface 42 are integral with each and formed from a plastic material having a wall thickness greater than that of bag 26 (referring to FIG. 2). For example, lower surface 40 and side surface 42 may be formed via a roto-molding or injection-molding process. It is contemplated, however, that lower surface 40 and/or side surface 42 could alternatively be made from another material (e.g., metal) and/or by another process (e.g., deep draw, stamping, welding, etc.). In the disclosed example, container 38 is generally rectangular, with a square or rectangular cross-section. It is contemplated, however, that container 38 could be tapered (e.g., have a smaller cross-section at lower surface 40) and/or have a circular cross-section. Side surface 42 may have an open end located opposite lower surface 40, the open end providing access to an interior of container 38.

The disclosed embodiment of container 38 includes additional features that increase a functionality of waste receptacle 12. In particular, a lid 44 may be provided to close off the open end of side surface 42, and one or more lower supports (e.g., wheels) 46 be formed at an intersection of lower and side surfaces 40, 42. With supports 46 in this location, container 38 may be pushed or pulled to cause waste receptacle 12 to pivot about lower supports 46. It is contemplated, however, that non-tilting configurations (e.g., three- or four-support configurations) may also be used, if desired.

In the embodiment of FIG. 3, since waste receptacle 12 is rigid, little or no deformation may occur during loading, regardless of how much waste is placed therein. For this reason, container 38 may be joined to lower supports 46 by way of a visual indicator 48, which may not rely on deformation to indicate the loading of waste receptacle 12. Indicator 48 may include, among other things, a receiver 50, a plunger 52 moveably disposed relative to (e.g., within) receiver 50, and a resilient member (e.g., a spring) 54 positioned between plunger 52 and receiver 50 to bias these components apart. Either of receiver 50 or plunger 52 may be rigidly connected to container 38, while the other of receiver 50 and plunger 52 may be rigidly connected to lower support 46. With this configuration, plunger 52 may displace relative to receiver 50 (e.g., as resilient member 54 is compressed between these components) by a distance related to an amount (e.g., a weight) of waste placed inside of container 38. In some embodiments, this displacement distance may be observed and, as will be described in more detail below, used to determine the amount of waste inside of container 38. It is contemplated that container 38, lower support 46, receiver 50, and/or plunger 52 could be indexed (e.g., have horizontal line markings, vertical line markings, color codings, etc.) such that the displacement distance is more readily and/or accurately distinguishable.

Figure 4:
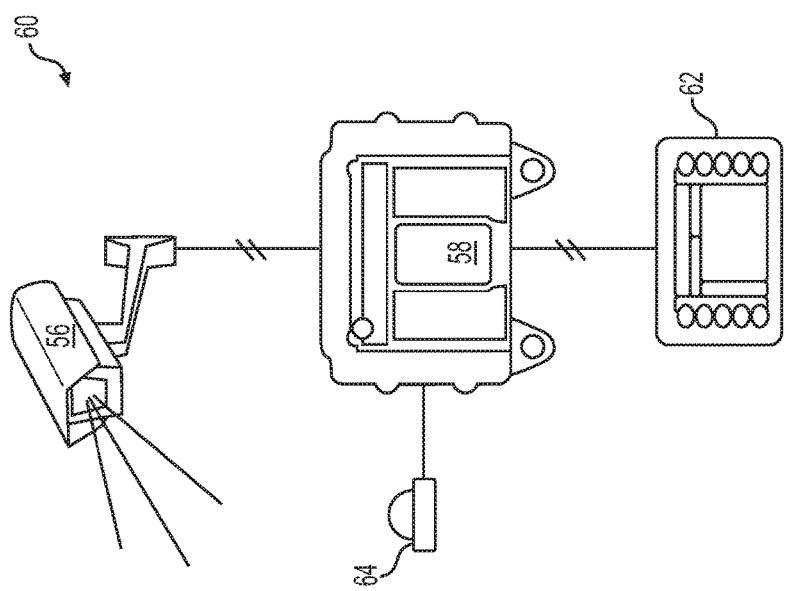
FIG. 4 is a diagrammatic illustration of an exemplary disclosed system that may be used in conjunction with the waste receptacles of FIGS. 2 and 3.

As shown in FIG. 4, an optical sensor (e.g., a camera) 56 may be used in some applications to capture and image of visual indicator 32 and/or 48, and to generate corresponding signals directed to an onboard and/or offboard controller 58. The transmission could be wired or wireless, and based on one or more proprietary protocol, such as NFC, Bluetooth, Wi-Fi (e.g., 802.11), cellular signals (e.g., GSM, CDMA, or LTE), satellite, etc.

Controller 58 may include means for monitoring, recording, storing, indexing, processing, interpreting, and/or communicating information based on the signals generated by sensor 56. These means may include, for example, a memory, one or more data storage devices, a central processing unit, or any other component that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Based on the signals received from sensor 56, controller 58 may be configured to correlate the spacing, distance, lengths, displacement, colors, etc. of visual indicators 32 and/or 48 to an amount of waste within each receptacle and/or collected at each customer location. The correlation may be made by reference to one or more maps stored in memory. Each map may include, for example, a table, an algorithm, an equation, a graph, or another type of relationship. For example, a vertical spacing between adjacent horizontal lines on strap 28 and/or a length of a horizontal line on bag 26 may be used as a weighted variable in a single- or multi-variable equation to calculate the weight and/or volume of waste inside a particular receptacle 12.

As also shown in FIG. 4, sensor 56 and controller 58 may form portions of a waste management system ("system") 60 that is configured to track, assist, and/or control movements of service vehicle(s) 10 (shown only in FIG. 1). In addition to sensor 56 and controller 58, system 60 may also include a display 62 and a locating device 64. In some embodiments, controller 58, display 62, and/or locating device 64 are part of a mobile unit (e.g., a smartphone, a tablet, or a laptop), while in other embodiments, controller 58, display 62, and/or locating device 64 are part of a stationary unit (e.g., a cab-mounted console, a back office computer, etc.). Information regarding the waste retrieved by service vehicle 10 may be detected via sensor 56, interpreted by controller 58, and/or shown on display 62. In some instances, this information may be linked (e.g., by controller 58 and/or an operator of vehicle 10) to a particular customer location (e.g., based on a location detected by locating device 64, based on a manually input address, based on an automatically identified receptacle, etc.).

In some embodiments, controller 58 may need to first filter and/or buffer the signal from sensor 56 prior to recording and/or cause display of the information described above. In particular, controller 58 may be configured to utilize the signals generated by sensor 56 only when the signals have a value above a predefined threshold and/or within an expected range. For example, only when the signals indicate that at least a known weight of receptacle 12 (or at least a minimum amount greater than the known receptacle weight, for example at least 25 lbs. greater) has been visually observed, will controller 58 record and/or cause the signals to be displayed. This may help to avoid errors in tracking the weight of collected materials.

It is contemplated that display 62, in addition to showing sensory and locational information, could also be used to provide a way for an operator of service vehicle 10 to input observances made while traveling around the environment. For example, the operator may be able to enter a type and/or condition of waste observed at a particular location, an amount of waste in or around receptacle 12, a fill status of a particular receptacle 12, a condition of receptacle 12, a location of receptacle 12, a type of waste material being transported, an end-disposition location of the waste material, and/or other information about receptacle 12 and the waste engaged by, loaded into, or otherwise processed by service vehicle 10. The information may be input in any number of ways, for example via a touch screen interface, via one or more buttons, via a keyboard, via speech recognition, or in another manner known in the art.

Locating device 64 may be configured to generate signals indicative of a geographical position and/or orientation of service vehicle 10 relative to a local reference point, a coordinate system associated with a local waste environment, a coordinate system associated with Earth, or any other type of 2-D or 3-D coordinate system. For example, locating device 64 may embody an electronic receiver configured to communicate with satellites, or a local radio or laser transmitting system used to determine a relative geographical location of itself. Locating device 64 may receive and analyze high-frequency, low-power radio or laser signals from multiple locations to triangulate a relative 3-D geographical position and orientation. Based on the signals generated by locating device 64 and based on known kinematics of service vehicle 10, controller 58 may be able to determine in real time, the position, heading, travel speed, acceleration, and orientation of service vehicle 10. This information may then be used by controller 58 to update the location and condition of service vehicle 10 and/or receptacles 12 in an electronic map or database of the environment.

It is contemplated that locating device 64 may take another form, if desired. For example, locating device 64 could be an RFID reader configured to interact with an RFID tag located within a surrounding environment (e.g., at a customer location, on receptacle 12, etc.), or another type of scanner configured to read another type of indicia (e.g., a barcode) within the environment. Based on the reading of the RFID tag or other indicia, the location and/or orientation of service vehicle 10 may be linked to the known location of the RFID tag or other indicia within the environment. In one embodiment, sensor 56 may function to both detect the amount of waste within a particular receptacle 12 and to read an RFID tag on the receptacle 12. In this embodiment, a separate and dedicated locating device 64 may not be necessary.

INDUSTRIAL APPLICABILITY

The disclosed receptacles and system may be applicable to the waste service industry, where service-monitoring can affect profitability and efficiency. The disclosed receptacles may be used to manually determine an amount of waste collected from a particular customer location or used together with the disclosed system to automatically determine the collected amount.

During a service event, the operator 24 of vehicle 10 (referring to FIG. 1) may pickup and toss flexible receptacles 12 completely into bed 16 or only lift and dump rigid receptacles 12 into bed 16. In some embodiments, powered lifting devices (not shown) may be used to assist the operator or to automatically perform the operator's duties. At any time during the service event (e.g., during arrival to the customer location, after vehicle 10 has stopped, during receptacle lifting or dumping, etc.), visual indicators 32 and/or 48 may be observed. This observation may be manually performed by the operator 24 and/or automatically performed via sensor 56. During this observation, a distance between, a length of, a width of, a color of, and/or a position associated with markings 34, markings 36, receiver 50, and/or plunger 52 may be captured, measured, noted, or otherwise determined. When the observation is manually performed by the operator, the associated information may then be manually recorded (e.g., via display 62, via communication with a back office, via a writing utensil, etc.). When the observation is automatically performed by sensor 56, sensor 56 may generate corresponding signals directed to controller 58.

Controller 58 may receive the manually recorded information and/or signals from sensor 56, and interpret the information and/or signals; analyze the information and/or signals; link the information and/or signals to locational information received from locating device 64; and/or cause the corresponding information to be shown on display 62.

It will be apparent to those skilled in the art that various modifications and variations can be made to the disclosed receptacles and system. Other embodiments will be apparent to those skilled in the art from consideration of the specification and practice of the disclosed receptacles and system. It is intended that the specification and examples be considered as exemplary only, with a true scope being indicated by the following claims and their equivalents.

What is claimed is:

1. A waste receptacle, comprising:
a bag having an opening configured to receive waste;
a visual indicator associated with the bag and configured to indicate a weight and volume of waste inside the bag based on deformation; and
a processor configured to:
monitor signals generated by an optical sensor at a first customer location, the signals including visual images of an exterior of a first receptacle having visual indicators on the exterior of the first receptacle, wherein the optical sensor is located on-board a service vehicle;
determine the first receptacle associated with the first customer location; and
determine the waste weight and volume associated with the first receptacle at the first customer location based on the visual images and the determination of the first receptacle associated with the first customer location;
wherein the determination of the waste weight and volume based on the visual images is determined based on referencing a map stored in a memory, the map correlating the visual indicators to a weight and volume of waste.

2. The waste receptacle of claim 1, wherein the bag is configured to stretch as it is loaded, and the visual indicators include at least one marking on the bag.

3. The waste receptacle of claim 2, wherein the at least one marking changes in size during stretching of the bag.

4. The waste receptacle of claim 2, wherein the at least one marking changes in color during stretching of the bag.

5. The waste receptacle of claim 2, wherein the at least one marking includes two markings that move apart during stretching of the bag.

6. The waste receptacle of claim 2, wherein the at least one marking includes:
a first marking generally aligned with a pull of gravity acting on the waste; and
a second marking oriented generally orthogonal to the first marking.

7. The waste receptacle of claim 1, wherein:
the waste receptacle includes a strap connected to the bag;
the strap is configured to stretch during loading of the bag; and
the visual indicator includes at least one marking on the strap.

8. The waste receptacle of claim 7, wherein:
the visual indicator is a first visual indicator;
the bag is configured to stretch during loading; and
the waste receptacle further includes at least a second visual indicator having at least one marking on the bag.

9. A waste receptacle, comprising:
a rigid container having an opening configured to receive waste;
a support configured to support the rigid container; and
a visual indicator disposed between the rigid container and the support, wherein the visual indicator is configured to indicate a weight and volume of waste inside the rigid container; and
a processor configured to:
monitor signals generated by an optical sensor at a first customer location, the signals including visual images of an exterior of a first receptacle having visual indicators on the exterior of the first receptacle, wherein the optical sensor is located on-board a service vehicle;
determine the first receptacle associated with the first customer location; and
determine the waste weight and volume associated with the first receptacle at the first customer location based on the visual images and the determination of the first receptacle associated with the first customer location;
wherein the determination of the waste weight and volume based on the visual images is determined based on referencing a map stored in a memory, the map correlating the visual indicators to a weight and volume of waste.

10. The waste receptacle of claim 9, wherein the support includes a wheel.

11. The waste receptacle of claim 10, wherein the visual indicator includes:
a second receptacle connected to one of the rigid container and the wheel;
a plunger connected to the other of the rigid container and the wheel; and
a resilient member disposed between the receptacle and the plunger.

12. The waste receptacle of claim 11, wherein the visual indicator includes at least one marking on at least one of the rigid container, the wheel, the receptacle, and the plunger.

13. A system for monitoring waste collected by a service vehicle, comprising:
a receptacle having an opening configured to receive waste;
an indicator associated with the receptacle and configured to visually indicate a weight and volume of waste inside the receptacle;
a sensor configured to capture an image of the indicator and to generate a signal corresponding to the image;
a display; and
a controller in communication with the sensor and the display, the controller being configured to cause a representation of the weight and volume of waste in the receptacle to be shown on the display based on the signal; and
a processor configured to:
monitor signals generated by the sensor at a first customer location, the signals including images of the indicator located on an exterior of the receptacle, wherein the sensor is located on-board a service vehicle;
determine the receptacle associated with the first customer location; and
determine the weight and volume of waste in the receptacle at the first customer location based on the images and the determination of the receptacle associated with the first customer location;
wherein the determination of the weight and volume of waste in the receptacle based on the images is determined based on referencing a map stored in a memory, the map correlating the indicator to the weight and volume of waste.

14. The system of claim 13, wherein:
the controller includes the map; and
the controller is configured to:
cause the representation of the weight and volume of waste in the receptacle to be shown on the display based on the determination.

15. The system of claim 13, wherein:
the receptacle includes a bag that is configured to stretch as the bag is loaded with waste, and a strap connected to the bag that is also configured to stretch when the bag is loaded with waste; and
the indicator includes at least one marking on at least one of the bag and the strap.

16. The system of claim 15, wherein the at least one marking changes in at least one of size and color during stretching of the bag or the strap.

17. The system of claim 16, wherein the at least one marking includes two markings that move apart during stretching of the bag or the strap.

18. The system of claim 15, wherein the at least one marking includes:
a first marking generally aligned with a pull of gravity acting on the waste and configured to indicate a weight of the waste inside the bag; and
a second marking oriented generally orthogonal to the first marking and configured to indicate a volume of the waste inside the bag.

19. The system of claim 13, wherein:
the receptacle includes:
a rigid container having an opening configured to receive waste; and
a support configured to support the rigid container; and
the indicator is disposed between the rigid container and the support.

20. The system of claim 19, wherein the support includes a wheel.

21. The system of claim 20, wherein the indicator includes:
a second receptacle connected to one of the rigid container and the wheel;
a plunger connected to the other of the rigid container and the support; and
a resilient member disposed between the receptacle and the plunger.

* * * * *